March 12, 1957     O. C. KESTLER     2,784,715
CATAPHORESIS UNIT
Filed March 25, 1953     2 Sheets-Sheet 1
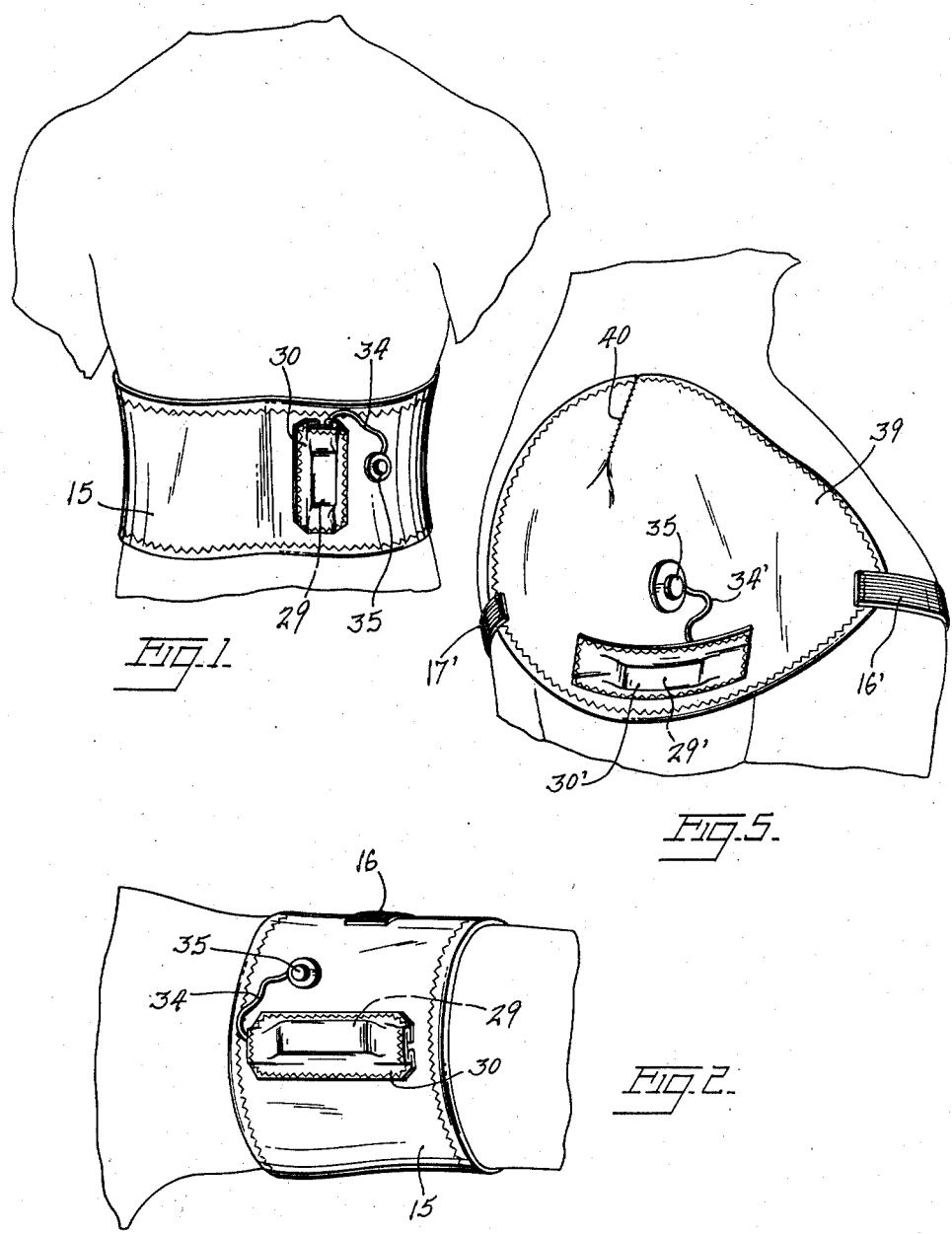
INVENTOR.
OTTO COLMAN KESTLER
BY
ATTORNEY March 12, 1957 — O. C. KESTLER — 2,784,715
CATAPHORESIS UNIT
Filed March 25, 1953 — 2 Sheets-Sheet 2
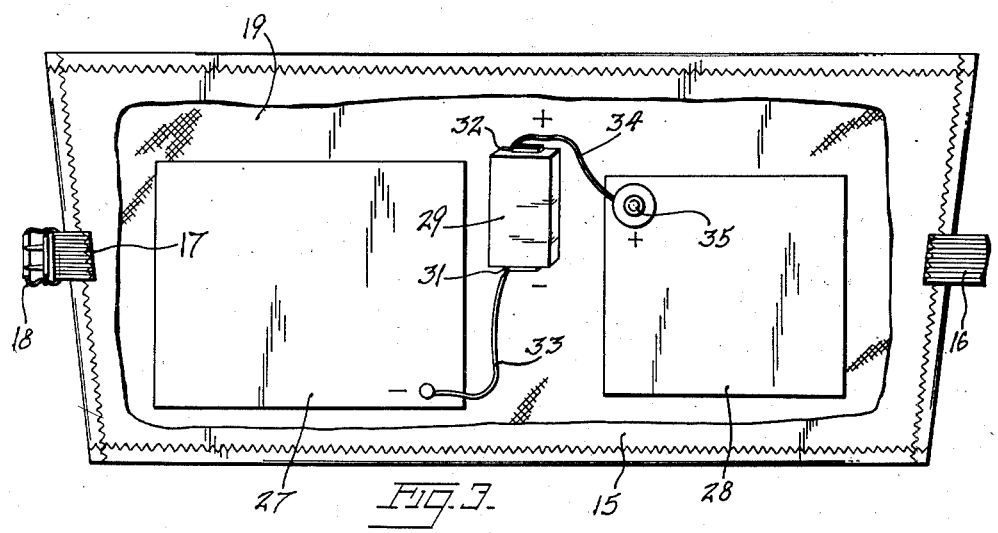
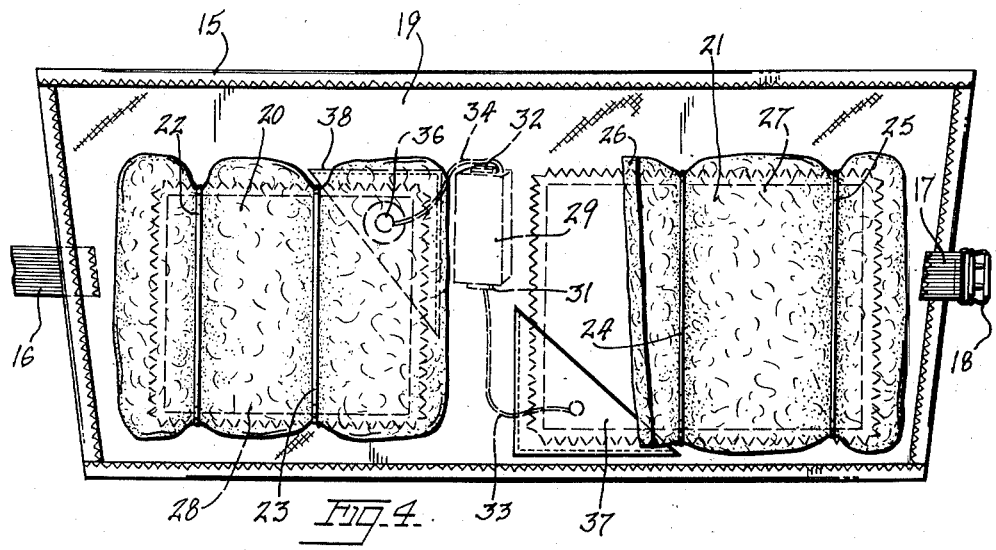
INVENTOR.
OTTO COLMAN KESTLER

United States Patent Office 2,784,715
Patented Mar. 12, 1957

2,784,715
CATAPHORESIS UNIT

Otto Colman Kestler, New York, N. Y.

Application March 25, 1953, Serial No. 344,527

4 Claims. (Cl. 128—172.1)

This invention relates to new and useful improvements in cataphoresis units.

More particularly, the present invention proposes the construction of an improved cataphoresis unit which can be used not only to hold a medicament over an area to be treated, but which will also assist in the application and penetration of the medicament.

Another object of the present invention proposes forming the new cataphoresis unit with a cover of rubber-like insulator sheet material with an inner panel of soft pervious cloth and two spaced electrodes beneath the inner panel with a battery secured to the cover and connected with the electrodes and removably securing two separate pads of cotton or gauze or the like saturated with an electrolyte solution for applying mild electric current to the body area covered by the unit.

Still further, the present invention proposes making the electrolyte solution to serve not only as an electrical carrier but also as an ointment by using sodium salicylate or histamine dihydrochloride with tincture capsicum or glyceryl monostearate in a base of spermacetti, sodium lauryl sulphate and water.

As a further object, the present invention proposes arranging the electrodes beneath the inner panel of the unit and providing a protective insulator shield of soft flexible sheet material at the points were the electrodes are connected to conduits leading to the battery so that no burning or uncomfortable shock will occur.

The present invention further proposes the novel arrangement of the cataphoresis unit structure so that electrodes made of sheets of blotter paper coated with metallic paint are disposed between a plastic or rubber cover and a cloth inner panel with the battery connected with the electrodes by at least one snap fastener conductor one-half of which is secured to the outside of the cover and other half of which is secured to a flexible conductor or wire extending outside the cover.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a pictorial perspective view showing the new cataphoresis unit secured about the waist of a patient.

Fig. 2 is a similar view showing the cataphoresis unit secured around the leg or arm of the patient.

Fig. 3 is an outside plan view of the cataphoresis unit with parts broken away to show structure within.

Fig. 4 is an inside plan view of the cataphoresis unit with parts broken away and hidden parts shown in dotted outline.

Fig. 5 is a view similar to Figs. 1 and 2 but showing the cataphoresis unit as modified and applied to the shoulder of a patient.

The cataphoresis unit of the present invention in accordance with the form of the invention shown in Figs. 1 to 4, inclusive, has a flat outer cover 15 of flexible, impervious, electrically insulated sheet material such as rubber or thermoplastic sheeting.

At one end of the generally rectangular-shaped cover 15 a strap 16 is stitched or otherwise secured, and at the other end a buckle strap 17 with buckle 18 is similarly attached to provide means on the outer cover to secure it over the area to be covered.

An inner panel 19 of perivous flexible fabric material is disposed inside the cover 15, the marginal edge of the cover being folded over the peripheral edges of the inner panel and secured as by stitching. Preferably, the inner panel is made of soft cloth such as linen or cotton.

Two absorbent pads 20 and 21 (see Fig. 4) are removably held to the inner panel 19 by spaced loops 22, 23, 24 and 25. The spaced loops 22 and 23 hold pad 20 and loops 24 and 25 hold pad 21. The pads 20 and 21 are held in spaced relation by the loops and do not contact one another. Loops 22, 23, 24 and 25 may be of elastic or may simply be cords or string of inelastic material long enough to permit the pads to be drawn under them.

Each of the pads 20 and 21 is moistened with an electrolyte solution 26 indicated by the stippling on Fig. 4. The electrolyte solutions which have been found preferable, not only to act as an electrical conductor but also to act as an ointment, are by weight as follows:

(a) Sodium salicylate 1%, tincture capsicum 3%, in a base of spermacetti, sodium lauryl sulphate and water;

(b) Sodium salicylate 1% and glyceryl salicylate 23% in a base of spermacetti 6%, sodium lauryl sulphate 1% and water 69%;

(c) Histamine dihydrochloride ½% in a highly absorbable emollient base of spermacetti, sodium lauryl sulphate and water;

(d) Histamine dihydrochloride ½% and glyceryl monostearate 23% in a base of spermacetti 6%, sodium lauryl sulphate 1% and water 70%.

The electrolyte solution 26 moistening the absorbent pads 20 and 21 penetrates the pervious inner panel or layer 19 of the dressing but cannot seep through or leak through the impervious cover 15 of the dressing.

An electrode 27 of the modified shock therapy type is secured behind the pad 21 between the inner panel 19 and cover 15 as viewed in Fig. 4. A second similar electrode 28 is secured behind the pad 20 between the inner panel 19 and cover 15. The electrodes 27 and 28 are formed of sheets of blotter paper coated on one side with metallic paint (see Fig. 3).

A battery 29, such as the twenty-two volt dry cell battery shown in Fig. 3, is secured to the cover 15 by a sheet or patch 30 of plastic or rubber insulating material. The sheet 30 is stitched or heat sealed to the cover.

Battery 29 has terminals 31 and 32. Terminal 31 is connected by a conduit wire 33 to electrode 27, wire 33 being insulated and running beneath the inner panel 19. A conduit wire 34 has one end connected to terminal 32 and the other end projecting out from under the battery covering sheet 30 and extending on the outside of the cover 15 of the dressing.

One-half or member 35 of a snap fastener conductor is fixed to the free end wire conduit 34 and the mating or other half 36 of the snap fastener conductor is secured to the cover 15 on the outside of the cover. The member or half 36 of the snap fastener conductor on the cover extends through the cover and contacts electrode 28.

When the two halves 35 and 36 of the snap fastener conductor are snapped together the battery is connected with both electrodes.

A pair of insulator shields 37 and 38 of sheet material are secured to the inner panel 19. Shield 37 is disposed over the electrode 27 and shield 38 is disposed over the electrode 28. In this manner all danger of burn or uncomfortable shock from direct contact with the points of contact of the wires 33 and 34 with the electrodes 27 and 28, respectively, is prevented. These points are where the electrodes are connected most directly with the battery.

Shields 37 and 38 preferably are made of thermoplastic or rubber sheeting like cover 15.

In Fig. 5, the cover 39 is modified in shape with darts 40 being provided so as to make it cup-shaped. The remainder of the structure is the same as above described and numbered similarly but primed.

In use, the pads 20 and 21 of the unit are first moistened with the medicament and the unit is then wrapped around the part of the body to be treated, such as the waist, as shown in Fig. 1. The unit is fastened to the body by the strap 16 and buckle 18 with the pads in engagement with the flesh of the body. The circuit through the battery is then closed and current supplied to the electrodes and pads through the conductors 33 and 34. The heat from the pads will open the pores in the skin and the cataphoric action of the continuous process will drive or carry the medicament through the open pores of the skin into the body.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A cataphoresis unit comprising an outer cover of flexible impervious electrically insulated sheet material, means on the outer cover to secure it over the area to be covered, an inner panel of pervious flexible fabric material, two absorbent pads, spaced loop means on the inner panel removably holding the pads to the panel in spaced relation, a patch of insulating material on the cover adapted to hold an electric battery, an electrode secured beneath each pad between the inner panel and the cover, and conductors for connecting the electrodes to the battery.

2. A cataphoresis unit comprising an outer cover of flexible impervious electrically insulated sheet material, means on the outer cover to secure it over the area to be covered, an inner panel of pervious flexible fabric material, two absorbent pads, spaced loop means on the inner panel removably holding the pads to the panel in spaced relation, a patch of insulating material on the cover adapted to hold an electric battery, an electrode secured beneath each pad between the inner panel and the cover, conductors for connecting the electrodes to the battery, and a pair of insulator shields of sheet material on the inner panel, one shield being disposed over the point on each electrode where the electrode is connected most directly with the battery.

3. A cataphoresis unit comprising an outer cover of flexible impervious electrically insulated sheet material, means on the outer cover to secure it over the area to be covered, an inner panel of pervious flexible fabric material, two absorbent pads, spaced loop means on the inner panel removably holding the pads to the panel in spaced relation, a patch of insulating material on the cover adapted to hold an electric battery, an electrode secured beneath each pad between the inner panel and the cover, a conduit connected to one of the electrodes and extending to the patch for connection to one terminal of the battery, a conduit joining the other electrode to one half of a snap fastener connection located on the exterior of the cover, a conduit connected to the mating half of the snap fastener and extending to the patch for connection to the other terminal of the battery.

4. A cataphoresis unit comprising an outer cover of flexible impervious electrically insulated sheet material, means on the outer cover to secure it over the area to be covered, an inner panel of pervious flexible fabric material, two absorbent pads, spaced loop means on the inner panel removably holding the pads to the panel in spaced relation, a patch of insulating material on the cover adapted to hold an electric battery, an electrode secured beneath each pad between the inner panel and the cover, a conduit connected to one of the electrodes and extending to the patch for connection to one terminal of the battery, a conduit joining the other electrode to one half of a snap fastener connection located on the exterior of the cover, a conduit connected to the mating half of the snap fastener and extending to the patch for connection to the other terminal of the battery, said electrodes being sheets of blotter paper coated on one side with metallic paint.

References Cited in the file of this patent

UNITED STATES PATENTS

| | | |
|---|---|---|
| 309,897 | Thurston | Dec. 30, 1884 |
| 679,239 | Mossberg | July 23, 1901 |
| 770,014 | Linn | Sept. 13, 1904 |
| 857,664 | Overman | June 25, 1907 |
| 1,583,087 | Morse | May 8, 1926 |
| 1,967,927 | Deutsch | July 24, 1934 |
| 2,047,308 | Chapman | July 14, 1936 |
| 2,667,162 | Zwahlen | Jan. 26, 1954 |

FOREIGN PATENTS

| | | |
|---|---|---|
| 63,439 | Switzerland | Dec. 19, 1912 |
| 502,972 | Belgium | May 31, 1951 |

OTHER REFERENCES

Clinical Medicine and Surgery for August 1935, pp. 386–9. Copy in Division 55.